United States Patent
Davis et al.

(10) Patent No.: US 9,231,824 B2
(45) Date of Patent: Jan. 5, 2016

(54) CONFIGURATION SYNCHRONIZATION BETWEEN ELECTRONIC GAMING MACHINES AND A SUPPORTING SERVER

(75) Inventors: Robert T. Davis, Carson City, NV (US); Christopher J. Frattinger, Sparks, NV (US); Matthew J. Ward, Northbrook, IL (US); Dale R. Bucholz, Palatine, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1596 days.

(21) Appl. No.: 12/524,500

(22) PCT Filed: Dec. 18, 2007

(86) PCT No.: PCT/US2007/025883
§ 371 (c)(1),
(2), (4) Date: Jul. 24, 2009

(87) PCT Pub. No.: WO2008/094242
PCT Pub. Date: Aug. 7, 2008

(65) Prior Publication Data
US 2010/0106823 A1    Apr. 29, 2010

Related U.S. Application Data

(60) Provisional application No. 60/897,668, filed on Jan. 26, 2007.

(51) Int. Cl.
*G06F 15/16* (2006.01)
*H04L 12/24* (2006.01)
*G07F 17/32* (2006.01)

(52) U.S. Cl.
CPC ............ *H04L 41/0846* (2013.01); *G07F 17/32* (2013.01); *G07F 17/323* (2013.01); *H04L 41/0813* (2013.01)

(58) Field of Classification Search
USPC .................................. 709/203, 224, 230, 220
See application file for complete search history.

(56) References Cited

U.S. PATENT DOCUMENTS 6,645,077 B2 * 11/2003 Rowe ............................... 463/42
6,884,173 B2 * 4/2005 Gauselmann ................... 463/42
(Continued)

FOREIGN PATENT DOCUMENTS

EP    1231577    11/2001    ............. G07F 17/32
EP    1363252     4/2003    ............. G07F 17/32
(Continued)

OTHER PUBLICATIONS

PCT International Search Report for International Application No. PCT/US2007/025583 dated Aug. 21, 2008 (4 pages).
(Continued)

*Primary Examiner* — Jason Recek
(74) *Attorney, Agent, or Firm* — Nixon Peabody LLP

(57) ABSTRACT

An illustrative method manages configuration information of electronic gaming machines (EGMs) and maintains server configuration information at a server that supports EGMs in a server-client relationship. The server configuration information contains stored information about the configuration of each EGM. EGM configuration information transmitted from the EMGs is received at the server. The server and EGM configuration information each contains corresponding fields with values representing information about predetermined factors. The values in the fields of the server configuration information are compared with the values in corresponding fields of the EGM configuration information. A report is generated based on the comparison.

23 Claims, 3 Drawing Sheets

(56) References Cited

U.S. PATENT DOCUMENTS

| | | | |
|---|---|---|---|
| 2003/0083943 A1* | 5/2003 | Adams et al. | 705/14 |
| 2006/0264256 A1 | 11/2006 | Gagner et al. | 463/20 |
| 2006/0287098 A1* | 12/2006 | Morrow et al. | 463/42 |
| 2007/0232392 A1* | 10/2007 | Pace | 463/29 |
| 2008/0064501 A1* | 3/2008 | Patel | 463/40 |
| 2008/0146344 A1* | 6/2008 | Rowe et al. | 463/42 |
| 2008/0153588 A1* | 6/2008 | Muir et al. | 463/29 |

FOREIGN PATENT DOCUMENTS

| | | | |
|---|---|---|---|
| EP | 1463008 | 2/2004 | G07F 17/32 |
| EP | 1469436 | 4/2004 | G07F 17/32 |
| WO | WO 02/32526 | 4/2002 | A63F 9/24 |

OTHER PUBLICATIONS

PCT Written Opinion for International Application No. PCT/US2007/025583 dated Aug. 20, 2008 (7 pages).

* cited by examiner

CONFIGURATION SYNCHRONIZATION BETWEEN ELECTRONIC GAMING MACHINES AND A SUPPORTING SERVER

RELATED APPLICATIONS

This application is a U.S. national stage filing of International Application No. PCT/US2007/025883, filed Dec. 18, 2007. This application claims priority to the International Application No. PCT/US2007/025883 and U.S. Provisional Application No. 60/897,668, filed Jan. 26, 2007 to the same inventors and hereby incorporates by reference those applications in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to electronic gaming machines (EGMs) that support wagering on wagering games, and more particularly to the synchronization of EGM configuration information stored in a server with the actual configuration of the corresponding gaming machines.

BACKGROUND OF THE INVENTION

Gaming machines, such as slot machines and video poker machines, have been a cornerstone of the gaming industry for several years. EGMs, especially microprocessor-based gaming machines that follow a client/server configuration, provide flexibility through software control and the ability to communicate data and download software from a supporting server. Although EGMs are clients of a server, the configuration of the EGM may also be updated locally such as by software and/or data stored on nonvolatile media, e.g. compact flash memory card, which is directly loaded by the EGM. This enhances configuration flexibility and the ability to change a gaming application, i.e. game software currently controlling the EGM, without requiring support of the server. This is advantageous in permitting the EGM to be updated where the server is inoperative or communications are not available with the server. However, an update of an EGM not implemented by the server leaves the server with configuration data about the EGM that may not be current. Because the server relies on stored configuration information for each EGM for maintenance, reporting, authentication, etc., having incorrect configuration information at the server about an EGM can result in operational difficulties. Therefore, there is a need to minimize inconsistencies between the actual configuration of EGMs and configuration data about each EGM maintained by the supporting server.

SUMMARY OF THE INVENTION

According to one aspect of the present invention, an embodiment includes a method that manages configuration information of EGMs and maintains server configuration information at a server that supports EGMs in a server-client relationship. The server configuration information contains stored information about the configuration of each EGM. EGM configuration information transmitted from the EMGs is received at the server. The server and EGM configuration information each contains corresponding fields with values representing information about predetermined factors. The values in the fields of the server configuration information are compared with the values in corresponding fields of the EGM configuration information. A report is generated based on the comparison.

According to another aspect of the invention, an embodiment includes a server adapted to implement this method.

According to yet another aspect of the invention, a computer readable tangible storage medium is encoded with instructions for enabling a server to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
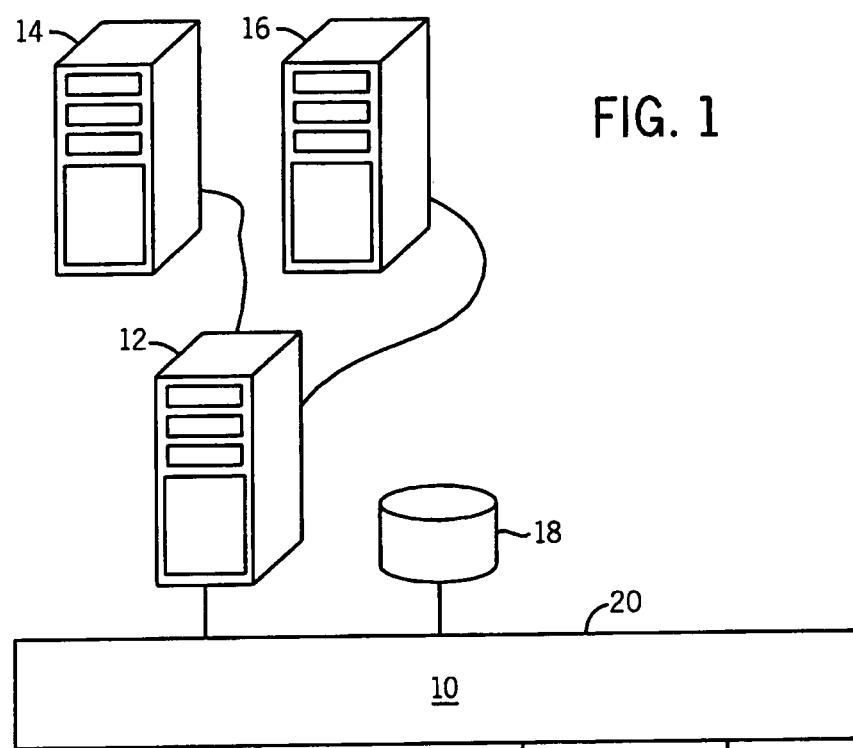
FIG. 1 is a block diagram of a gaming system suited for incorporation of an embodiment of the present invention.

Referring to FIG. 1, an illustrative gaming system 10 includes a server 12 supported by workstations 14 and 16 that provide licensing management and business rules management, respectively. A file server 18 provides a nonvolatile storage resource such as for storing configuration data used by the server and gaming software that can be downloaded to EGMs under the control of the server 12. Workstation 14 is responsible for licensing management and for validating that an EGM has been authorized to receive the download of a new game upon the server 12 receiving a request to download the new game to the EGM. Server 12 operates under instructions from workstation 16 to implement a predetermined set of business rules, i.e. conditions, restrictions and/or requirements that impact the operation of the EGMs. For example, business rules may determine a maximum wager that can be placed at an EGM based on time of day, day of week, etc. Further the server may include a set of rules that govern the operation of the EGMs promulgated by the controlling jurisdiction.

A communication bus 20 provides a bidirectional communication channel among the elements in gaming system 10. In the illustrative system, server 12, file server 18, stationary EGMs 22 and 24, and wireless access node 26 are coupled to bus 20. Stationary EGMs 28 and 30 are each coupled to bus 20 by a wireless communication link supported by the wireless access node 26. Similarly, mobile gaming machines 32 and 34 are each coupled to bus 20 by a wireless communication link supported by the wireless access node 26. A "stationary" EGM refers to electronic gaming machine of a cabinet style that remains fixed during the play of a game by a user. A "mobile" gaming machine refers to an electronic gaming machine contained in a portable apparatus that can be transported by a user during the play of a game. For example, the portable apparatus of a mobile gaming machine could include a laptop computer with wireless capabilities, a personal digital assistant, a cellular telephone with appropriate input and output capabilities, etc.

Figure 2:
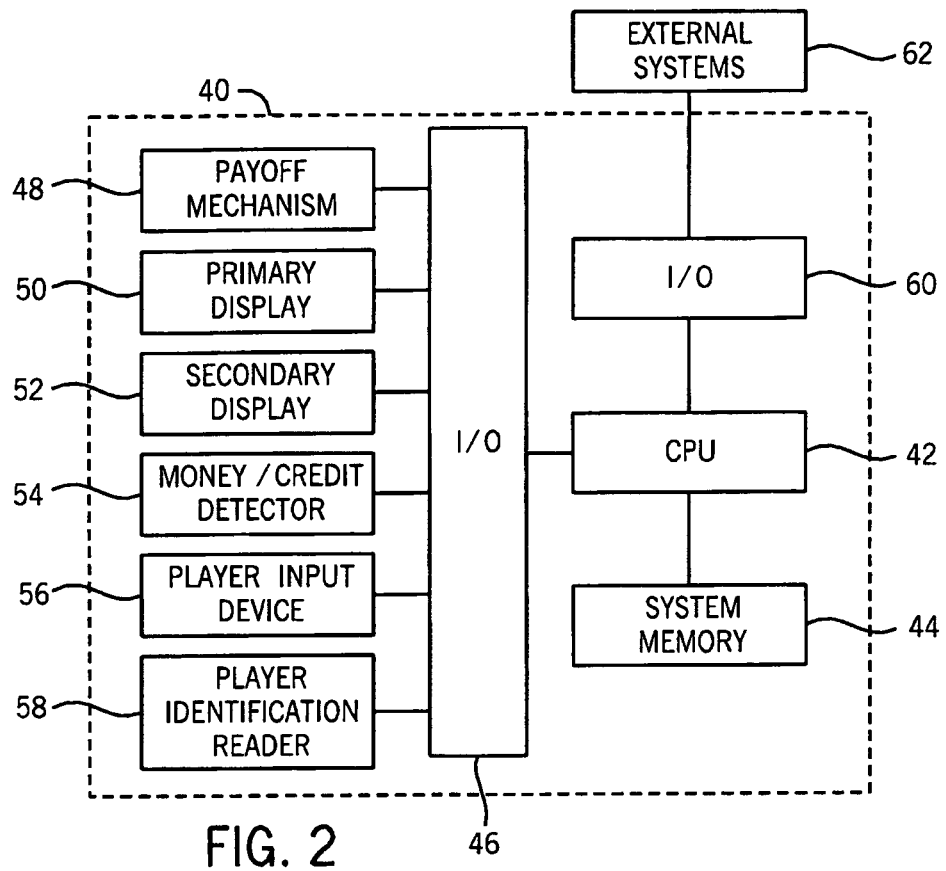
FIG. 2 is a block diagram of a representative EGM.

FIG. 2 shows an exemplary EGM 40 that includes a central processing unit (microprocessor) 42 that is supported by system memory 44 that may include read-only memory, random access memory and a nonvolatile storage memory such as a hard drive. An input/output module 46 supports internal communications between the CPU 42 and various input and output devices. These devices may include a payoff mechanism 48, a primary display 50, a secondary display 52, a money/credit detector 54, a player input device 56 and a player identification reader 58. These devices are intended to be representative of a variety of input and output devices that may be employed by the EGM. A communications input/output device 60 provides an interface between the CPU 42 and external systems 62 enabling bidirectional communications for EGM 40. In accordance with the illustrative system 10, the input/output device 60 would support bidirectional data communications with bus 20 or bidirectional communications over a wireless link with wireless access node 26.

Figure 3:
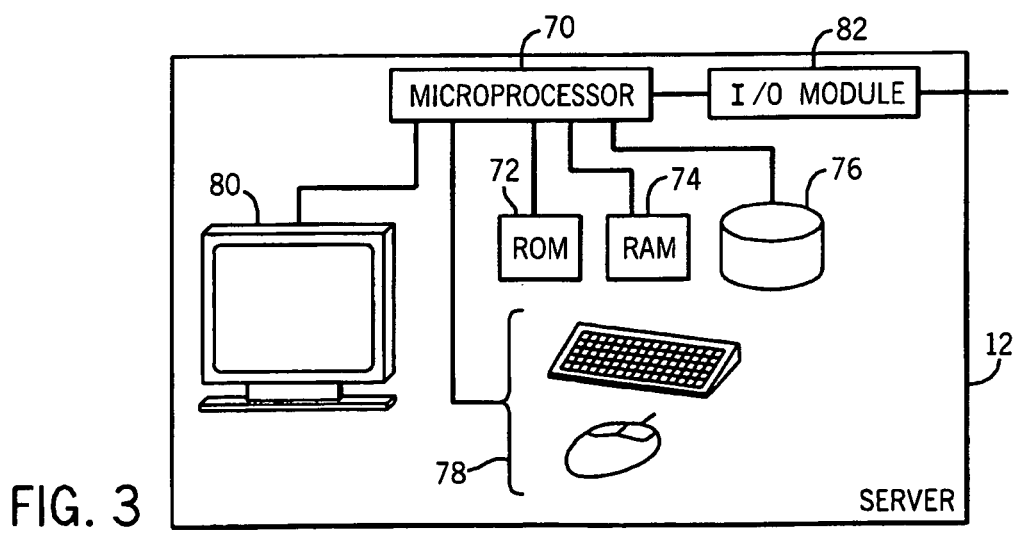
FIG. 3 is a block diagram of a representative server.

FIG. 3 is a representative computing apparatus 12 for a server. It is also applicable as architecture for the workstations 14 and 16 of FIG. 1. A microprocessor 70 performs processes and tasks based on stored program instructions. It is supported by read-only memory (ROM) 72, random access memory (RAM) 74 and nonvolatile data storage device 76. As will be understood by those skilled in the art, data and stored program instructions in ROM 72 is typically utilized by microprocessor 70 to initialize and boot the computing apparatus. An application program, e.g. a program that controls the implementation of one or more functions performed by the server, is stored in storage element 76. At least active portions of the application program will be typically stored in RAM 74 for ready access and processing by microprocessor 70. A variety of user inputs 78 such as a keyboard, keypad, and mouse can be utilized to control the operation of the server and applications running on it. A display screen 80 provides a visual output, e.g. characters and/or charts of operational parameters and visual representation of EGMs and related status of the EGMs, for an administrator of the server. An input/output (I/O) module 82 provides a communication interface permitting microprocessor 70 to transmit and receive data with external nodes.

Figure 4:
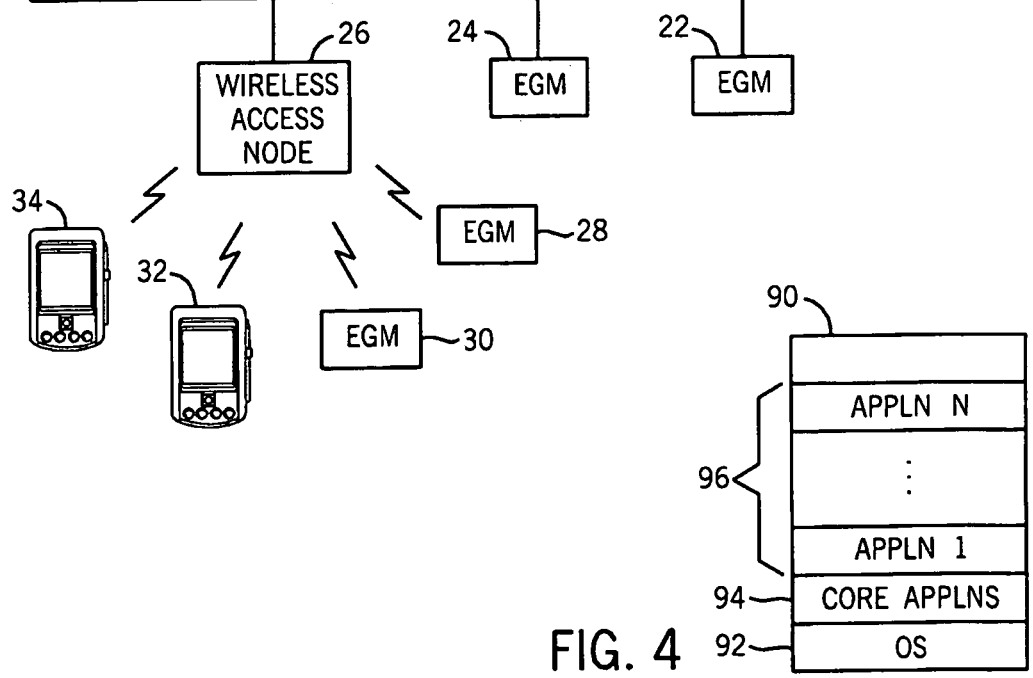
FIG. 4 is a functional block diagram illustrating software used to control an EGM and/or server.

FIG. 4 shows a functional block diagram illustrating software used to control the server. This organization also applies to the EGMs and workstations. The overall software environment 90 includes an operating system (OS) 92 such a Linux, core applications 94 that add functionality to the features of the OS and/or provide an interface with higher level applications 96 that are responsible for implementing user instructions and/or conditions. One of the applications 96, or at least a portion of an application, on the server is responsible for maintaining lists of supported EGMs, stored configuration data for each of the supported EGMs as well as synchronization of this stored data with periodic updates of actual configurations of the respective EGMs. Another of the applications 96, migration software, is responsible for reconfiguring and/or reloading configuration data to be utilized by new operational software loaded into the server in order to minimize work by the system administrator following the operational software change. As used herein "operational software" refers to software on the server that controls execution of the ongoing functions of the server, and "migration software" refers to the described software functionality regardless of whether separate from or incorporated as part of server software.

Figure 5:
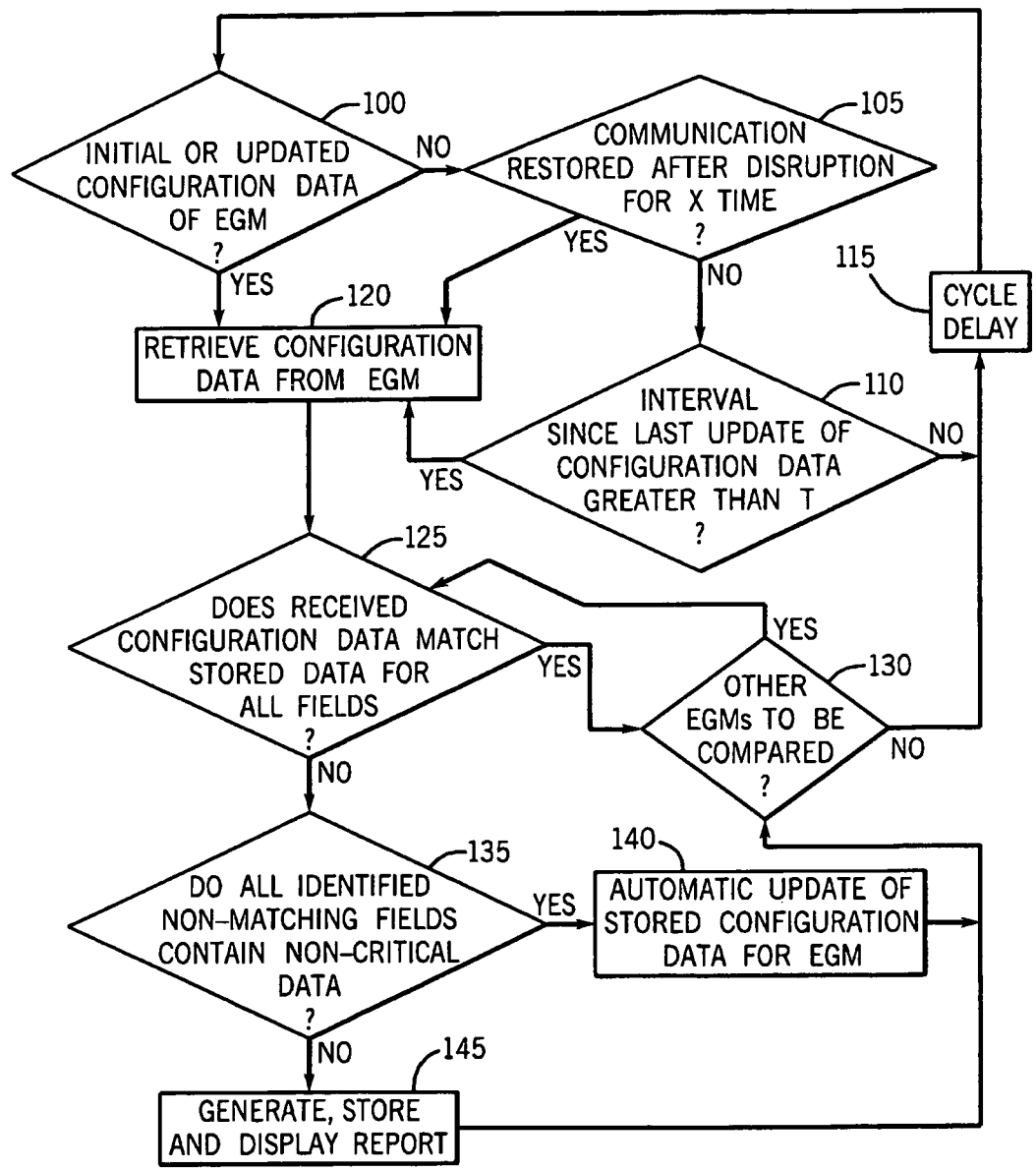
FIG. 5 is a flow chart of an illustrative method in accordance with an embodiment of the present invention.

FIG. 5 shows a flow chart of an illustrative method for maintaining synchronization of configuration data stored at the server for an EGM and the current configuration of the EGM. In step 100 a determination is made of whether initial or updated configuration data of an EGM has been received. When a new EGM is first installed in the system of the server, the server is notified of its initial installation. If an existing EGM undergoes a local update of its configuration, the server will be notified. A NO determination at step 100 leads to a determination of whether communication has been restored after a disruption of X time at step 105. The predetermined amount of time X could be set to a few seconds or several minutes. A NO determination by step 105 leads to a further determination by step 110 of whether the time interval since the last update of configuration data is greater than a predetermined time T, where T could be set to several minutes or a few hours. A NO determination by step 110 causes a cycle delay at step 115, where the cycle delay determines how often the server repeats this method starting at the beginning with step 100. Depending upon the system design, the cycle delay could, for example, be set to a few minutes.

A YES determination by step 100, step 105 or step 110 results in the server retrieving configuration data from the EGMs at step 120. Following the retrieval of the configuration data, a determination is made in step 125 by the server of whether all of the retrieved configuration data for an EGM matches the stored configuration data for that EGM. The configuration data for each EGM includes a plurality of fields each containing a value representing a corresponding condition or parameter associated with the EGM. The YES determination by step 125 means that the received configuration data matched the existing configuration data for the EGM and hence no action is required to account for data that does not match. Following the YES determination by step 125, a determination is made in step 130 of whether other EGMs remain to have configuration data compared with the corresponding stored configuration data. The server maintains a listing of all EGMs supported by it. A YES determination at step 130 causes the process to return to step 125 for the next EGM. A NO determination by step 130 indicates that configuration data comparisons have been made for all of the EGMs and the process returns to the delay cycle 115.

A NO determination by step 125 indicates that at least the value in one field of the stored configuration data for the EGM did not match the value in the corresponding field of the retrieved configuration data from the EGM. As a result of this NO determination, another determination may be made in step 135 of whether all of the identified non-matching fields contain non-critical data. As used herein, non-critical data means data that can contain different values or values within a predetermined range where the exact value is not critical for system administration. For example, a particular EGM may be authorized for maximum wagers up to $10. A first field in the configuration data for this EGM stores the maximum wager value of $10 and a second field stores a current wager limit of $5. Assuming that these values were stored in the configuration data at the server for the EGM and that the newly retrieved configuration data for the EGM has a first field value of $10 and a second field value of $10, the change of the second field value from $5 to $10 would be considered non-critical. In contrast, a change of the first field value would be considered critical. Depending upon the jurisdictional requirements and the level of control desired by system administration, the fields in the configuration data set will have a predetermined setting determined by the system administrator labeling each field as critical or non-critical.

A YES determination by step 135 represents that all of the non-matching fields between the retrieved configuration data and the stored configuration data at the server are non-critical data. Following such a YES determination, an automatic update is made by the server of the stored configuration data for the EGM with any non-matching data from the retrieved configuration data replacing the corresponding data stored at server for this EGM. Following this step the process returns to step 130 to determine if other EGMs remain to be considered.

A NO determination by step 135 represents that at least one of the non-matching fields between the retrieved configuration data and the stored configuration data at the server contains critical data. Following this determination a report is generated, stored and displayed by the server representing a lack of synchronization of configuration data. This may include a pop-up window that displays either the entire report or just the configuration differences. At this point manual intervention or consideration by a system administrator may be used to determine the appropriate action, if any, to be taken. The action could include manual acceptance/rejection of differences on an item by item basis, or an overall acceptance or rejection of differences. Preferably the report will contain indicia identifying the configuration fields containing critical data that does not match. For example, the non-matching fields could be highlighted or rendered in a color on a display screen to permit the system administrator to quickly identify the non-matching critical data. If desired, an audible or visual alarm can be used to alert the system administrator that non-matching critical data has been identified. If any configuration differences are not accepted, the server will preferably send a communication to the EGM causing it to change its configuration to match the configuration accepted at the server. Following step 145 the process returns to step 134 where a determination is made of whether other EGMs remain to be processed.

The server in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified.

Each of these embodiments and obvious variations thereof are contemplated as falling within the spirit and scope of the claimed invention, which is set forth in the following claims.

What is claimed is:

1. A method for managing configuration information of electronic gaming machines (EGMs) that permit wagering on games comprising:
maintaining first configuration information at a server that supports EGMs in a server-client relationship, where the first configuration information contains stored information about the configuration of each EGM;
receiving second configuration information transmitted from the EGMs to the server, the first and second configuration information each containing corresponding fields that contain values representing information about predetermined factors associated with each field;
comparing by the server the values in the fields of the first configuration information with the values in corresponding fields of the second configuration information, each of the fields of the first configuration information having been predetermined to contain one of critical and non-critical data;
determining for each field of the second configuration information that contains a value that is not equal to the value stored in the corresponding field of the first configuration information whether the field with non-matching values has been predetermined to contain non-critical data;
automatically updating by the server the first configuration for the subject EGM by storing values contained in the non-matching fields of the second configuration information in the corresponding fields of the first configuration information for only those fields predetermined to contain non-critical data; and
generating, depending on the comparing, a configuration report by the server for the subject EGM if any non-matching values exist in corresponding fields in the first and second configuration information predetermined to contain critical data.

2. The method of claim 1 wherein the receiving includes receiving the second configuration information transmitted from the EGMs following a restoration of communications between the server and EGMs following an interval during which communications were not available between the server in the EGMs.

3. The method of claim 1 wherein the receiving includes determining that a time interval since the receipt of a last received second configuration information is greater than a predetermined time interval.

4. The method of claim 1 further comprising determining if each of the fields of the first configuration information for a subject EGM contains the same value as the corresponding fields of the second configuration information for the subject EGM, upon determining that each of the fields of the first configuration information for a subject EGM contains the same value as the corresponding fields of the second configuration information for the subject EGM, causing the generating not to generate a configuration report for the subject EGM.

5. The method of claim 1 wherein at least one set of the fields of the first configuration information contains a first field predetermined to contain critical data and a second field predetermined to contain non-critical data.

6. The method of claim 5 wherein the second field of the first configuration information is automatically updated by the server with the value contained in the corresponding field of the second configuration information, and the first field of the first configuration information is not automatically updated by the server with the value contained in the corresponding field of the second configuration information since the first field contains critical data.

7. The method of claim 1 wherein the determining includes determining at least one non-matching value in a field has been predetermined to contain critical data, the updating not automatically updating values in fields in the first configuration information corresponding to non-matching values in critical data fields in the second configuration information, the generating including generating the configuration report based on the determination of non-matching values in critical data fields.

8. The method of claim 7 further comprising inhibiting any updating of the first configuration information based on the determination.

9. The method of claim 7 wherein the generating includes generating a configuration report based on the determination where non-matching values in critical data fields are identified by indicia that distinguishes non-matching values in critical data fields from non-matching values in non-critical data fields.

10. The method of claim 1, wherein the critical data is predetermined by a system administrator of the server and the EGMs.

11. The method of claim 1, wherein the critical data includes at least one limit of a predetermined range critical to system administration of the server and the EGMs, and the non-critical data includes a value within the predetermined range.

12. A server that supports electronic gaming machines (EGMs) that permit wagering on games comprising:
a storage device maintaining first configuration information that supports EGMs in a server-client relationship, where the first configuration information contains stored information about the configuration of each EGM;
a communication interface receiving second configuration information transmitted from the EGMs, the first and second configuration information each containing corresponding fields that contain values representing information about predetermined factors associated with each field;
a processor coupled to the storage device and the communication interface, for comparing the values in the fields of the first configuration information with the values in corresponding fields of the second configuration information where each of the fields of the first configuration information are predetermined to contain one of critical and non-critical data;
the processor further:
determining for each field of the second configuration information that contains a value that is not equal to the value stored in the corresponding field of the first configuration information whether the field with non-matching values has been predetermined to contain non-critical data;
automatically updating the first configuration for the subject EGM by storing values contained in the non-matching fields of the second configuration information in the corresponding fields of the first configuration information for only those fields predetermined to contain non-critical data; and
generating a configuration report for the subject EGM if any non-matching values exist in corresponding fields in the first and second configuration information predetermined to contain critical data.

13. The server of claim 12 further comprising a sensor for sensing restoration of communications with the EGMs following an interval during which communications were not available with the EGMs, wherein the communications interface receives the second configuration information transmitted from the EGMs upon the sensor sensing restoration of communications with the EGMs following an interval during which communications were not available with the EGMs.

14. The server of claim 12 wherein the processor determines that a time interval since the receipt of a last received second configuration information is greater than a predetermined time interval.

15. The server of claim 12 wherein the processor determines if each of the fields of the first configuration information for a subject EGM contains the same value as the corresponding fields of the second configuration information for the subject EGM, upon determining that each of the fields of the first configuration information for a subject EGM contains the same value as the corresponding fields of the second configuration information for the subject EGM, not generating a configuration report for the subject EGM.

16. The server of claim 12 wherein at least one set of the fields of the first configuration information contains a first field predetermined to contain critical data and a second field predetermined to contain non-critical data.

17. The server of claim 16 wherein the second field of the first configuration information is automatically updated by the server with the value contained in the corresponding field of the second configuration information, and the first field of the first configuration information is not automatically updated by the server with the value contained in the corresponding field of the second configuration information since the first field contains critical data.

18. The server of claim 12 wherein the processor determines at least one non-matching value in a field has been predetermined to contain critical data, does not automatically update values in fields in the first configuration information corresponding to non-matching values in critical data fields in the second configuration information and generates a configuration report based on the determination of non-matching values in critical data fields.

19. The server of claim 18 wherein the processor inhibits any updating of the first configuration information based on the determination.

20. The server of claim 18 wherein the configuration report includes non-matching values in critical data fields that are identified by indicia that distinguishes non-matching values in critical data fields from non-matching values in non-critical data fields.

21. A tangible computer readable, non-transitory storage medium encoded with instructions for controlling a server that supports electronic gaming machines (EGMs) that permit wagering on games comprising:
computer readable storage instructions for maintaining first configuration information at the server that supports EGMs in a server-client relationship, where the first configuration information contains stored information about the configuration of each EGM;
computer readable storage instructions for receiving second configuration information transmitted from the EGMs to the server, the first and second configuration information each containing corresponding fields that contain values representing information about predetermined factors associated with each field;
computer readable storage instructions for comparing the values in the fields of the first configuration information with the values in corresponding fields of the second configuration information, each of the fields of the first configuration information having been predetermined to contain one of critical and non-critical data;
computer readable storage instructions for determining for each field of the second configuration information that contains a value that is not equal to the value stored in the corresponding field of the first configuration information whether the field with non-matching values has been predetermined to contain non-critical data;

computer readable storage instructions for automatically updating by the server the first configuration for the subject EGM by storing values contained in the non-matching fields of the second configuration information in the corresponding fields of the first configuration information for only those fields predetermined to contain non-critical data; and computer readable storage instructions for generating, depending on the comparing a configuration report by the server for the subject EGM if any non-matching values exist in corresponding fields in the first and second configuration information predetermined to contain critical data.

22. A computer readable non-transitory storage medium of claim 21 wherein at least one set of the fields of the first configuration information contains a first field predetermined to contain critical and a second field predetermined to contain non-critical data, the medium further comprising:

the computer readable storage updating instructions automatically updating the second field of the first configuration information with the value contained in the corresponding field of the second configuration information;

the computer readable storage updating instructions not automatically updating the first field of the first configuration information with the value contained in the corresponding field of the second configuration information since the first field contains critical data.

23. A method for managing configuration information of electronic gaming machines (EGMs) that permit wagering on games comprising:

maintaining first configuration information at a server that supports EGMs in a server-client relationship, where the first configuration information contains stored information about the configuration of each EGM;

receiving second configuration information transmitted from the EGMs to the server, the first and second configuration information each containing corresponding fields that contain values representing information about predetermined factors associated with each field;

comparing by the server the values in the fields of the first configuration information with the values in corresponding fields of the second configuration information; and automatically updating by the server the first configuration information for the subject EGM by storing the values contained in the non-matching fields of the second configuration information in the corresponding fields of the first configuration information.

* * * * *